Patented Oct. 7, 1924.

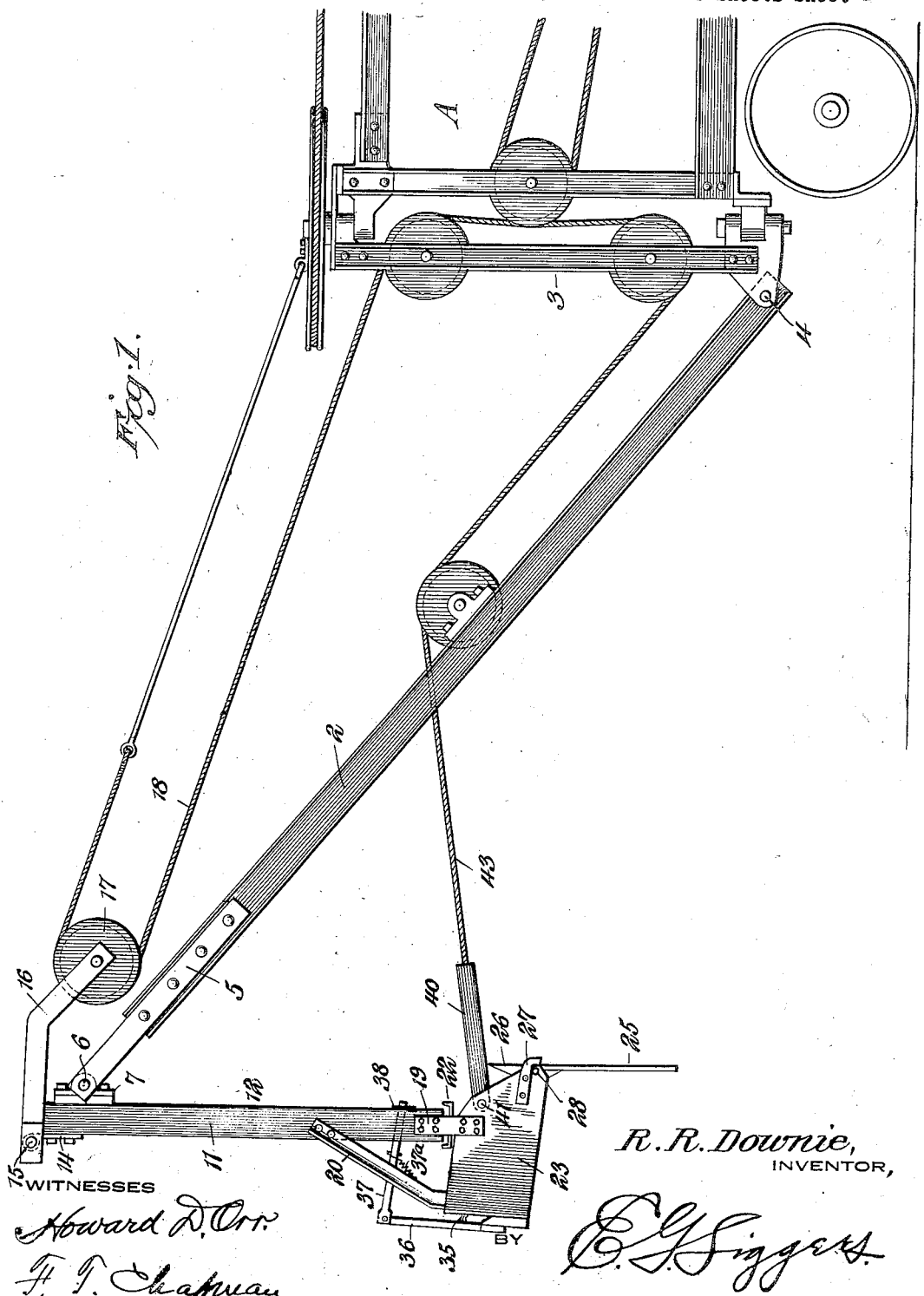

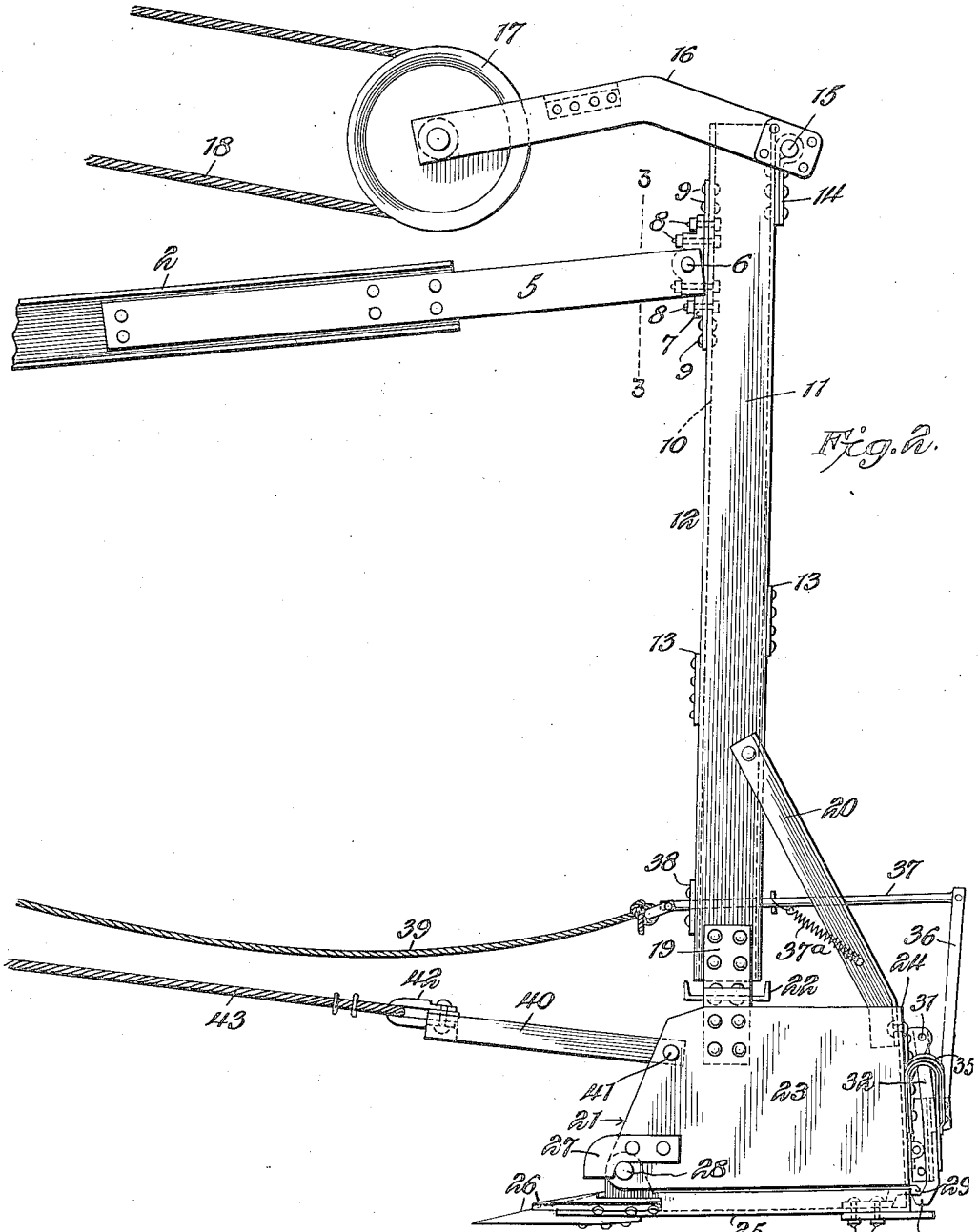

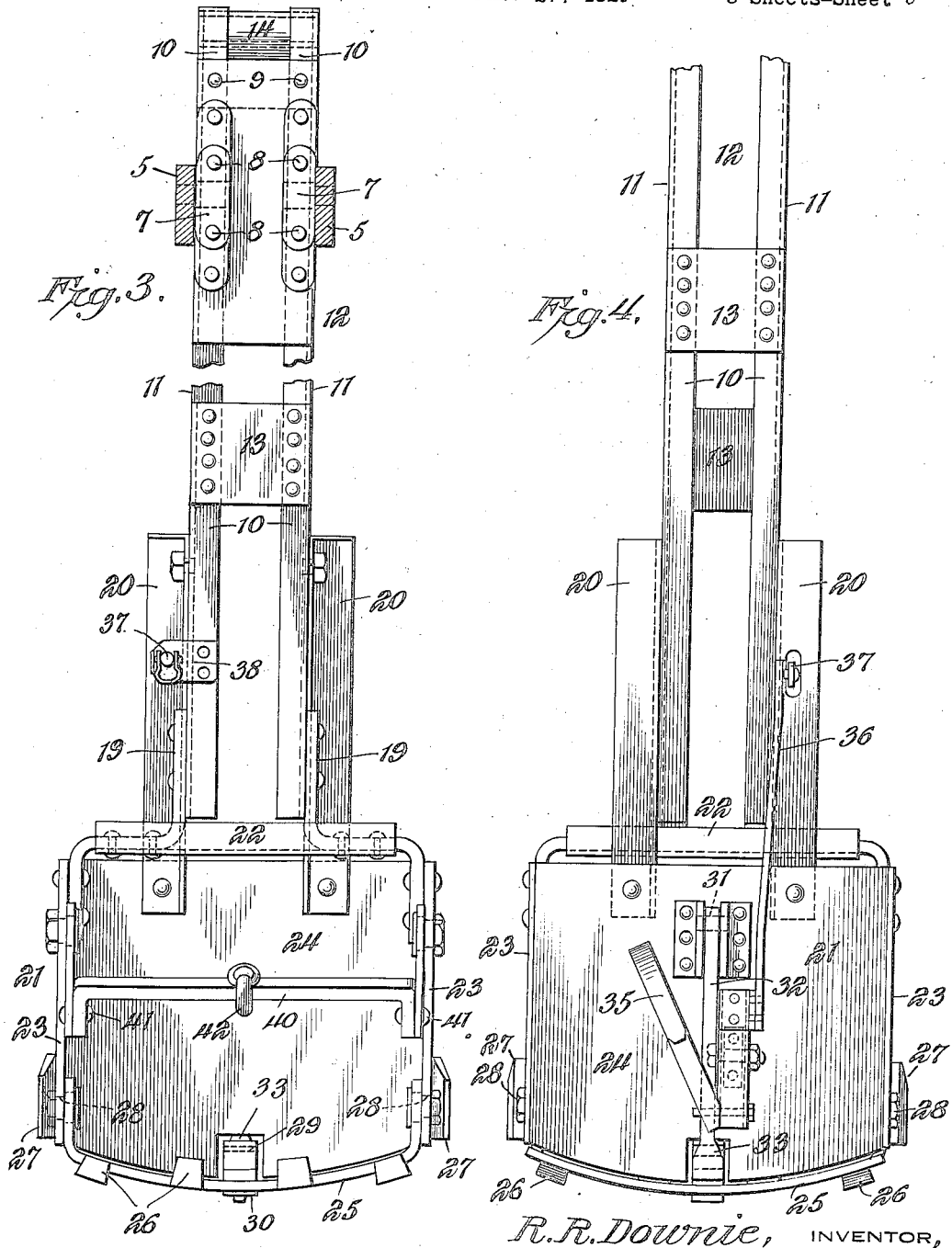

1,511,114

UNITED STATES PATENT OFFICE.

ROBERT REX DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA.

EXCAVATING MACHINE.

Application filed June 27, 1921. Serial No. 480,719.

*To all whom it may concern:*

Be it known that I, ROBERT R. DOWNIE, a citizen of the United States, residing at Beaver Falls, in the county of Beaver and State of Pennsylvania, have invented new and useful Improvements in Excavating Machines, of which the following is a specification.

This invention has reference to excavating machines, and its object is to provide a machine of the swinging and elevating boom type in which there is provided a ditcher stick carried at one end by the boom and at the other end supporting a scoop with a dumping bottom and in fixed relation to that end of the ditcher stick remote from the boom.

The boom and ditcher stick with the scoop fixed thereto is controlled by a hoisting line acting directly on the ditcher stick, and through it on the boom, while the scoop is controlled in its individual movements by another line serving as a hauling line. The invention possesses certain advantages over other excavating machines of similar character in that the hoisting sheave about which the hoisting line moves, is connected by bent bars with the upper end of the stick, whereby to prevent interference between the hoisting line or cable and the pivot pin by means of which the ditcher stick is connected to the boom. The bent bars are of such length that when the line or direction of pull of the hoisting cable, the length of the boom, and the length of the stick are in their most acute angular relationship the hoisting sheave is located to the rear of the stick pivot, thereby avoiding the possibility of the hoisting cable chafing on the stick pivot pin.

The ditcher stick comprises two spaced parallel channels having the advantage of imparting greater rigidity to the stick itself, and longer bearing for the stick pivot, than has previously been the case. In the operation of digging, the weight of the boom and stick are allowed to "ride" the scoop, in order to make the digging teeth with which the scoop is supplied to enter the material. Because of this, the boom, stick and scoop are supported at two points, that is, the boom pivot near the machine and the scoop teeth. In starting a cut, the center of gravity of these parts is considerably above their support and so the structure tends to lean toward one side or the other. If, however, such leaning toward one side is permitted, the opposite wall of the ditch will be undercut. This is prevented only by the torsional resistance of the boom and stick and the close fit of the stick pivot bearing. If, in a stick of a given weight, the sectional area is disposed as in two spaced members of channel section, it resists torque strain more rigidly than if the area were disposed as in a single I-beam stick.

The longer the stick pivot bearing, the less will the lower end of the stick depart from its true plane on account of a given amount of wear at such bearing. Also the longer the said bearing, the less the pressure, and hence the less the wear, on a given area of bearing surface, wherefore the long bearing reduces the wear to a minimum, and such wear as may occur is less of a hindrance to digging a plumb ditch.

The scoop is placed immediately beneath the stick, with the effect that greater strength is produced in the scoop itself, since the shocks and ordinary strains of digging originating in the teeth are transmitted more directly to the stick.

The invention contemplates the rigid attachment of the scoop to the stick, with the advantage that the hauling bail pivot is in fixed relationship to the stick pivot, whereby there is present no balanced element of unstable action to prevent immediate constant and complete control of the position of the scoop. The hauling line performs its secondary function of closing the scoop indirectly and through its primary function, which is that of governing the angularity of the stick and boom.

The scoop is of the dividing type, which is of advantage in discharging those sticky materials which tend to dump only in a mass or block Upon release of the customary latch, the material frees itself first from the walls only, the loosening from the bottom of the scoop being delayed until the load has dropped below the scoop and is largely clear of the walls. This delay of a part of the task of discharge, permits the entire available force to be concentrated first upon one part, and then upon another part, thus tending toward more complete and certain discharge. Not only is the weight of the load itself available for breaking the adhesion of the material to the wall, but the weight of the bottom also, clinging to the underside of the load, tends to pull it down.

In the scoop construction, the latch mechanism is subjected to a suitably light strain, while the bottom pivot bolts are subjected, properly, to the greater strain.

The teeth with which the swinging bottom of the scoop is provided, swing upwardly, when the scoop is dumped, and are thus, as well as by the controllability of the scoop, prevented from damaging the wagon or other container into which the load is dumped. This, and the fact that the bottom is free to swing, when dumping, through a full half circle, permit dumping into an extremely high car. In fact, this characteristic of the invention permits dumping into any car the sides of which it will clear when closed, because the bottom can be dragged in a horizontal position across either side without damage.

The invention will be best understood from a consideration of the following detailed description, taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Fig. 1 is a side elevation of a portion of a dredging machine embodying the invention.

Fig. 2 is an elevation of the forward end of the boom showing the assembly therewith of a dredger stick, scoop and hoisting and hauling lines, together with the dumping line.

Fig. 3 is a rear elevation of the dredger stick and the scoop carried thereby, with the boom extension irons in section on the line 3—3 of Fig. 2.

Fig. 4 is a front elevation of the structure shown in Fig. 3, but omitting the boom.

Referring to the drawings, there is shown the main body portion A of an excavating machine embodying the invention. This excavating machine includes power elements which may be of suitable and known construction and hence require no particular description.

Supported on the machine is a boom 2 carried adjacent to and projecting from the body of the machine by an upright mast or column 3, which turns on a pair of vertical alined pivots, and by a closely adjacent horizontal pivot 4, both pivots being common to the general form of excavating machine indicated in the drawings, and hence requiring no specific description. The boom 2 may be formed of opposed channel irons, as is customary, riveted or bolted together back to back with the channels facing outwardly. At the outer end of the boom, are extension irons 5 carrying a pivot pin 6 at their outer ends, and such pivot pin traverses brackets 7, constituting bearings for the pin, with the bearings carried by bolts 8 and also secured by rivets 9 to flanges 10 of beams 11 constituting parts of a ditcher stick 12 of structural formation, with the beams 11 rigidly connected together in spaced relation by bracing plates 13, whereby the ditcher stick is formed into a rigid structure capable of withstanding the strains to which it is subjected, and yet without adding materially to the weight of the stick.

At the end of the ditcher stick beams 11 adjacent to the boom are straps 14 on that side of the ditcher stick remote from the boom 2, and these straps constitute bearings for a connecting bar pivot pin 15 traversing one end of the connecting bar 16, having a sheave 17, about which is passed a hoisting line 18, carried to hoisting mechanism on the body of the excavator, but which need not be particularly shown or described, since in itself it forms no part of the invention. The angular connecting bar 16 which overhangs the pivotal connection of the boom and stick is one of the features of this invention. These bars are permanently bent, as seen in side elevation Fig. 2, so that in operation the center of the stick pivot may intersect the line of force which supports the entire device, without causing any interference of any of the parts.

The pivot pin 6 is located near one end of the ditcher stick, which end under certain conditions becomes the upper end of the ditcher stick. At the other end of the ditcher stick, it is connected by hangers 19 and braces 20 to opposite sides of a scoop body 21, the connections between the ditcher stick and the scoop body being rigid and immovable with relation to the hanger and scoop, the connections being mostly or, if desired wholly, by way of rivets.

The scoop body and hanger have interposed between them a brace member 22 extending crosswise of the scoop and hanger and directly resisting collapse of the scoop and distortion of the hangers.

The scoop body, as shown in the drawings, is of generally rectangular shape, although not confined to any such particular outline as indicated in the drawing. The scoop is formed of sheet or plate metal of suitable gage, with fixed sides 23 and the fixed back 24, while the front of the scoop is open, and the under side of the scoop is composed of a bottom member 25 constituting a closure therefor. The bottom 25 of the scoop is furnished with digging teeth 26 of appropriate shape fixedly secured to the bottom, while side rake teeth 27 are made fast to the sides of the scoop body above and in front of the bolts 28, protecting said bolts from the effects of the material into which the scoop enters.

The bottom pivot bolts 28 are located at the lower forward corners of the scoop body, while at the rear of the scoop body and of the bottom 25, midway of the sides of the scoop, is a latch tongue 29, secured to the bottom 25 by bolts 30. Attached to the rear of the scoop body by a pivot pin 31 is the upper end of a latch finger 32 having a nose 33 at the lower end to snap over latch engaging member 29 on the bottom.

In order to urge the latch finger 32 normally toward the latch tongue 29, there is provided a spring 35, which may be a multileaf spring. The latch finger 32 has secured thereto an arm 36 rising above the scoop and having pivoted thereto one end of a rod 37, projecting through the ditcher stick and through a guide plate 38 on the ditcher stick, and connected to one end of a dumping line 39 leading toward the body of the excavating machine, an additional spring 37ª connecting with the rod 37 and brace 20.

When the bottom 25 of the scoop is in the closed and latched position, a pull on the line 39 will withdraw the latch finger 32, thereby releasing the bottom 25 and causing it to rock about the axis of the bolts 28 and thus permit the bottom to drop, which it will do by gravity because of the weight of the bottom and the location of its pivotal axis near the digging end of the bottom, and also the weight of the load within the scoop.

That end of the scoop toward the machine A is provided with a bail 40 connected by pins 41 to the sides of the scoop, and the bail is furnished with a central link or clevis 42, to which there is connected one end of a hauling line 43, the other end being carried to the machine A, where suitable apparatus is furnished to draw the line, together with the scoop, toward the machine.

Suppose that the scoop is resting upon the ground, the ditcher stick is vertical and the weight of the boom is resting upon the stick. A pull upon the hoisting line 18 lifts the entire device including the boom, and the hauling line being unrestrained, the ditcher stick swings outwardly to what may be called the position of equilibrium, where the stick then projects beyond the boom in substantially a horizontal position. The hoisting line 18 is then released sufficiently to allow the teeth 26 of the scoop to touch the ground, and the hauling line 43 is drawn in whereupon the scoop is moved bodily toward the machine, taking up material in passing. If necessary, for the proper digging engagement of the teeth, the hoisting line 18 may be released and thus the scoop is borne down by the weight of the boom, or if the teeth engage too deeply, the hoisting line may be retracted to lift the entire device controlled by it.

When the scoop is loaded, and whether or not it has attained the end of its possible travel through the material, the hoisting line is drawn in, elevating the scoop, the hauling line 43 being in the meantime restrained. When the boom has reached the proper elevation, it is swung about the pivots of the mast 3 to a position over the ditch to be filled in, or over the wagon to be loaded. Suppose that the material is to be deposited in a wagon. The hauling line 43 is now let out or drawn in sufficiently to locate the scoop directly above the wagon. Now, a pull on the dump line 39 disengages the latch 32, and the bottom 25 swings downwardly about its pivotal axis 28, discharging material at that exact spot, the scoop body itself meanwhile remaining stationary. In case it is desirable to discharge the load with extreme accuracy, as when placing the final scoop full of a wagon load, the loaded scoop may be lowered into the precise position which it is desired the discharged material shall occupy. The latch is then disengaged and the body of the scoop lifted perpendicularly away from the load, as slowly and carefully as may be desirable, since the position of the scoop is at all times entirely within the control of the operator.

Again, if the load consists of a boulder, which would damage or break through a wagon if discharged into it from the usual height, the scoop may be lowered into the wagon, tripped and lifted just sufficiently to allow the boulder to glide off the scoop bottom, directly onto the floor of the wagon bed. When the scoop has been discharged, it is lifted by the hoisting line and swung about to a clear position, the bottom hanging vertically or open. The scoop is then drawn by the hauling line well in toward the boom. This is the initial position for the bottom closing operation. The hauling line is now released, allowing the scoop to drift outward and down a short distance, or until the ditcher stick is about in the vertical position. At this phase, the axis of the scoop bottom is considerably in advance of the center of gravity of the bottom. Now the hauling line is suddenly retracted and the momentum of the bottom carries it up and about its axis until the latch piece on the bottom strikes and automatically engages the spring latch 32 on the end of the scoop. The closing action of the bottom may be augmented, if necessary, by a coordinated manipulating of the hoisting line. This is caused to occur while the scoop is being drawn in, and at the precise instant when the bottom is swung up to within thirty degrees, more or less, of its closed position, the hoisting line may be quickly released a little, thus dropping the scoop a few inches. The effect is to hasten the relative movement and increase the momentum with which the scoop bottom attains the closed position. Should the closing operation be unsuccessful from one cause or another, it may be repeated, and the closing accomplished.

What is claimed is:—

1. In an excavating machine, the combination with a swinging boom mounted for up and down movements, of a ditcher stick pivoted to the outer end of the boom and extended above and below the same, means carrying a sheave and pivotally connected to that portion of said stick above the boom, a scoop fixed rigidly to the lower end of the said stick, a hoisting line passed about the sheave and controlling the boom and stick, and a hauling line connected to the scoop, said means with the sheave at the outer end extending inwardly over the boom and entirely free of the latter, and being of such length that when the direction of pull of the hoisting cable, the length of the boom and the length of the stick are in their most acute angular relationsip, the hoisting sheave is then located in rear of the stick pivot so that the hoisting cable will not chafe on the latter.

2. In an excavating machine, the combination with a swinging boom mounted for up and down movements, of a ditcher stick pivoted at its inner side to the outer end of the boom and extending above and below the same, means pivoted to the outer side of the ditcher stick above the pivot between the stick and the boom, said means carrying a sheave and extending inwardly over the boom and entirely free of the latter, a hoisting line passed about the sheave and leading to the hoisting mechanism for controlling the ditcher stick and boom, a scoop rigidly secured to the lower end of the ditcher stick, and a hauling line connected to the scoop, the said means carrying the sheave being of such length that when the direction of pull of the hoisting cable, the length of the boom and the length of the stick are in their most acute angular relationship, the hoisting sheave is then located in rear of the stick pivot, so that the hoisting cable will not chafe on the latter.

3. In an excavating machine, a boom, a pivoted ditcher stick carried by the boom, a scoop rigidly fixed to the ditcher stick, a bar pivoted to the ditcher stick at the side opposite the pivotal connection of the stick and boom, a sheave carried by the outer end of the bar, and a hoisting line passed about said sheave, said bar overhanging the boom and entirely free of the latter and being of such length that when the direction of pull of the hoisting cable, the length of the boom and the length of said stick are in their most acute angular relationship, the hoisting sheave is then located in rear of the stick pivot pin, so that the hoisting cable will not chafe on the latter.

4. In an excavating machine, the combination with a boom, a ditcher stick pivoted to the outer end of the boom at a point short of the end of the stick, an angular connecting bar pivoted to the end of the ditcher stick beyond the pivotal connection of the stick to the boom, and a sheave mounted on the end of the angular bar and adapted to receive the hoisting cable, said bar overhanging the boom and entirely free of the latter and being of such length that when the direction of pull of the hoisting cable, the length of the boom and the length of the stick are in their most acute angular relationship, the hoisting sheave is then located in rear of the stick pivot pin, so that the hoisting cable will not chafe on the latter.

5. In an excavating machine, the combination with a tiltable boom, of a ditcher stick pivoted to the outer end of the boom at a point short of the end of the stick, an angular connecting bar pivoted to the end of the stick beyond said pivotal connection, said connecting bar overhanging the pivotal connection of the boom to the stick with its outer end entirely free of the boom, and a sheave provided in the outer end of said connecting bar and adapted to receive the hoisting line, the said connecting bar being of such length that when the direction of pull of the hoisting cable, the length of the boom, and the length of the stick are in their most acute angular relationship, the hoisting sheave is then located in rear of the stick pivot pin, so that the hoisting cable will not chafe on the latter.

6. In an excavating machine, the combination of a boom mounted for up and down movements, a scoop-carrying member pivoted to the outer end of the boom at a point between the ends of said scoop-carrying member, a hoisting line engaging a pulley connected pivotally to the upper end of the scoop carrying member for controlling the up and down movements of the scoop-carrying member and boom, and in conjunction with the weight of the boom, for causing outward movements of the lower end of the scoop-carrying member, a scoop attached to the lower end of said scoop-carrying member, the attachment of the scoop to the scoop-carrying member being rigid and fixed throughout the entire cycle of operation, the inward end of said scoop being open, a hauling line for drawing the scoop inwardly, a pivoted bottom for the scoop pivoted to the sides of the latter, the axis of movement of the bottom being arranged transversely of the scoop and located adjacent to the open end thereof, and an automatically engaging latch means for normally maintaining the bottom in closed position.

7. In an excavating machine, the combination with a boom having spaced portions at the outer end, said spaced portions carrying a transversely arranged pivot pin, of a ditcher stick of structural steel comprising two spaced channel beams, a scoop rigidly secured to the lower end of the ditcher stick, means connected to the channel beams to maintain them in spaced apart relation, and spaced brackets secured to the inner flange of the channel beams, said pivot pin traversing said brackets and connecting the spaced portions of the boom to the opposite sides of said brackets, whereby a long pivot and bearing therefor is provided between the boom and the ditcher stick.

8. In an excavating machine, the combination with a boom having spaced irons at the outer end, said irons carrying a transverse pivot pin, of a ditcher stick of structural steel comprising two spaced channel beams with the channels facing inwardly, means connected to the channel beams to maintain them in spaced apart relation, a scoop rigidly secured to the lower end of the ditcher stick, and spaced brackets secured to the inner flange of the channel beams, said irons engaging the sides of said brackets and said pivot pin traversing said brackets, whereby a long pivot and bearing therefor is provided between the boom and the ditcher stick.

9. In an excavating machine, the combination with a tiltable boom, a ditcher stick pivoted at one end to the outer end of the boom, a scoop rigidly secured to the lower end of the ditcher stick at a point in rear of the open end of the scoop, and a drop bottom pivoted to the sides of the scoop at a point below and in advance of the rigid connection between the scoop and the stick.

10. In an excavating machine, the combination with a tiltable boom, of a ditcher stick, means for pivoting the outer end of the boom to the ditcher stick at a point below the upper end of the stick, a scoop having an open end facing the machine and rigidly secured to the lower end of the stick at a point in rear of said open end, and a drop bottom pivoted to the sides of the scoop at a point in advance of the rigid connection between said scoop and said stick, said bottom having earth-entering teeth at the pivotal end, latching means for the drop bottom at the rear end thereof, a hoisting line connected to the upper end of the stick for controlling the stick and the boom, and a hauling line connected to the scoop above the pivot of the bottom, the connection of said hauling line maintaining a fixed distance with relation to the pivotal connection between the ditcher stick and the boom.

11. In an excavating machine, the combination with a tiltable boom, of a ditcher stick, means for pivoting the outer end of the boom at a point on the ditcher stick below the upper end thereof, said stick being composed of two spaced apart beams, a scoop having an open end facing the machine and rigidly secured to the lower end of the stick at a point in rear of said open end, and a drop bottom pivoted to the sides of the scoop at a point in advance of the rigid connection between said scoop and said stick, said bottom having earth entering teeth at the pivotal end, latching means for teeth at the pivotal end, latching means for the drop bottom, a hoisting line connected to the upper end of the stick for controlling the stick and the boom, and a hauling line pivotally connected to the scoop above the pivot of the bottom.

12. In an excavating machine, a swinging boom mounted for up and down movements, a ditcher stick pivoted to the outer end of the boom and extended above and below the same, a scoop rigidly mounted at the lower end of the ditcher stick and provided with a drop bottom, means for pivoting said bottom to the scoop in advance of the rigid connection between the scoop and the stick, latching means for the drop bottom, a dumping line for operating the latching means, a hoisting line for the upper end of the stick for controlling the stick and the boom, and a hauling line connected to the scoop.

13. In an excavating machine, the combination with a swinging boom mounted for up and down movements, a ditcher stick pivoted to the outer end of the boom, a scoop rigidly secured to the lower end of the ditcher stick at a point in rear of the open end of the scoop, said open end facing inwardly toward the machine, a drop bottom pivoted to the sides of the scoop at a point in advance of the rigid connection between the scoop and the stick, said bottom having earth entering teeth at the pivotal end, a latch for the bottom, and means for releasing the latch, the toothed end of said bottom swinging upwardly with the teeth facing in that direction and extending above the bottom when the latter is in dumped position.

14. In an excavating machine, the combination with a swinging boom mounted for up and down movements, a ditcher stick pivoted to the outer end of the boom, a scoop rigidly secured to the lower end of the ditcher stick at a point in rear of the open end of the scoop, said open end facing inwardly toward the machine, a drop bottom pivoted to the sides of the scoop at a point in advance of the rigid connection between the scoop and the stick, said bottom having earth entering teeth at the pivotal end, rake teeth fast to the sides of the scoop and overhanging the pivots of the bottom so as to protect said pivots, a latch for the bottom, and means for releasing the latch, the toothed end of said bottom swinging upwardly with the teeth facing in that direction and extending above the bottom when the latter is in dumped position.

In testimony, that I claim the foregoing as my own, I have hereto affixed my signature.

ROBERT REX DOWNIE.